US012806923B2

(12) United States Patent
Tsujimura et al.

(10) Patent No.: US 12,806,923 B2
(45) Date of Patent: Nov. 24, 2026

(54) IMAGE RECORDING APPARATUS

(71) Applicant: BROTHER KOGYO KABUSHIKI KAISHA, Nagoya (JP)

(72) Inventors: Yuki Tsujimura, Konan (JP); Masatomo Yamaguchi, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 131 days.

(21) Appl. No.: 18/608,475

(22) Filed: Mar. 18, 2024

(65) Prior Publication Data

US 2024/0326480 A1 Oct. 3, 2024

(30) Foreign Application Priority Data

Mar. 30, 2023 (JP) ................................. 2023-055537

(51) Int. Cl.
*B41J 11/70* (2006.01)
*B41J 13/08* (2006.01)
*B41J 13/10* (2006.01)
*B41J 15/04* (2006.01)

(52) U.S. Cl.
CPC ............. *B41J 11/706* (2013.01); *B41J 13/08* (2013.01); *B41J 13/103* (2013.01); *B41J 15/042* (2013.01); *B41J 15/046* (2013.01); *B41J 15/048* (2013.01)

(58) Field of Classification Search
None
See application file for complete search history.

(56) References Cited

U.S. PATENT DOCUMENTS 5,223,940 A * 6/1993 Matsumoto .............. B26D 5/20 346/24
2007/0065217 A1 3/2007 Yoshioka
2022/0203714 A1* 6/2022 Sato ......................... B65H 7/02

FOREIGN PATENT DOCUMENTS

EP 2105314 A1 * 9/2009 ............. B26D 1/305
JP S59225668 A * 12/1984
JP 2002-002041 A 1/2002
JP 2007-076134 A 3/2007
JP 2011-183614 A 9/2011
JP 2013-086235 A 5/2013

OTHER PUBLICATIONS

English language translation of JP S59225668 A (Year: 1984).*

* cited by examiner

*Primary Examiner* — Ricardo I Magallanes
*Assistant Examiner* — Shlomit Chelst
(74) *Attorney, Agent, or Firm* — Baker Botts L.L.P.

(57) ABSTRACT

There is provided an image recording apparatus including a tray, a conveyor, a recording unit, and a cutter unit including at least one cutter. The conveyor includes a feeding mechanism and a pair of guides. The pair of guides defines a portion disposed on a downstream side in the conveying direction with respect to a cutting position brought about by the cutter unit in the conveyance path. The pair of guides have a first guide positioned upstream of the portion in the feeding direction and a second guide positioned downstream in the feeding direction of the portion. An angle on an acute angle side of the first guide with respect to the portion is smaller than an angle on an acute angle side of the second guide with respect to the portion.

8 Claims, 7 Drawing Sheets

IMAGE RECORDING APPARATUS

REFERENCE TO RELATED APPLICATIONS

This application claims priority from Japanese Patent Application No. 2023-055537 filed on Mar. 30, 2023. The entire content of the priority application is incorporated herein by reference.

BACKGROUND ART

An image recording apparatus is known, which records an image while conveying a long medium such as paper, cloth, label or the like along a conveyance path. Some of such image recording apparatuses are provided with a cutter for cutting the medium. For example, a system is known, which is provided with a sheet cutting device including a cutter arranged on a downstream side in the conveying direction with respect to an image forming unit (recording unit).

SUMMARY

In a case that the jamming of the medium occurs around the cutter, there is some possibility that a user may be injure his or her finger with the cutter when the user deals with the jamming. Therefore, careful operation is required. Time and labor caused by the jamming are increased.

An object of the present disclosure is to provide an image recording apparatus which makes it possible to suppress the time and labor caused by the jamming.

According to an aspect of the present disclosure, there is provided an image recording apparatus including: a tray; a conveyor; a recording unit and a cutter. The tray is configured to accommodate a medium in sheet form. The conveyor is configured to convey the medium accommodated in the tray in a conveying direction along a conveyance path. The recording unit is configured to record an image on the medium conveyed by the conveyor. The cutter unit includes at least one cutter configured to cut the medium in the conveyance path. The conveyor includes: a feeding mechanism configured to feed the medium accommodated in the tray in a feeding direction toward the conveyance path; and a pair of guides configured to interpose the conveyance path. The pair of guides defines a portion disposed downstream in the conveying direction of a cutting position brought about by the cutter unit in the conveyance path. The pair of guides includes a first guide located upstream of the portion in the feeding direction and a second guide located downstream of the portion in the feeding direction. An angle on an acute angle side of the first guide with respect to the portion is smaller than an angle on an acute angle side of the second guide with respect to the portion.

According to the present disclosure, for example, when the medium, which is unwound from the roll member, is conveyed by the conveyor, the forward end of the medium is easily brought in contact with the first guide. In this case, owing to the small angle of the first guide, the angle on the acute angle side, which is formed by the surface of the first guide opposed to the conveyance path and the forward end of the curled medium abutting against the surface, can be made not more than a predetermined value. It is possible to avoid the jamming. Therefore, the jamming hardly occurs, and hence it is possible to suppress the time and labor caused by the jamming. Further, for example, when a sheet of the medium, which is disposed on the uppermost layer of a plurality of sheets of the medium, is fed by the feeding mechanism, the forward end of the medium is easily brought in contact with the second guide. In such a situation, owing to the large angle of the second guide, the width of the path is large at the inlet portion of the pair of guides. It is easy to introduce or invite the forward end of the medium to the space between the pair of guides. Therefore, it is possible to appropriately guide the medium, and hence the jamming hardly occurs. It is possible to suppress the time and labor caused by the jamming.

DESCRIPTION

[Overall Construction of Printer]

Figure 1:
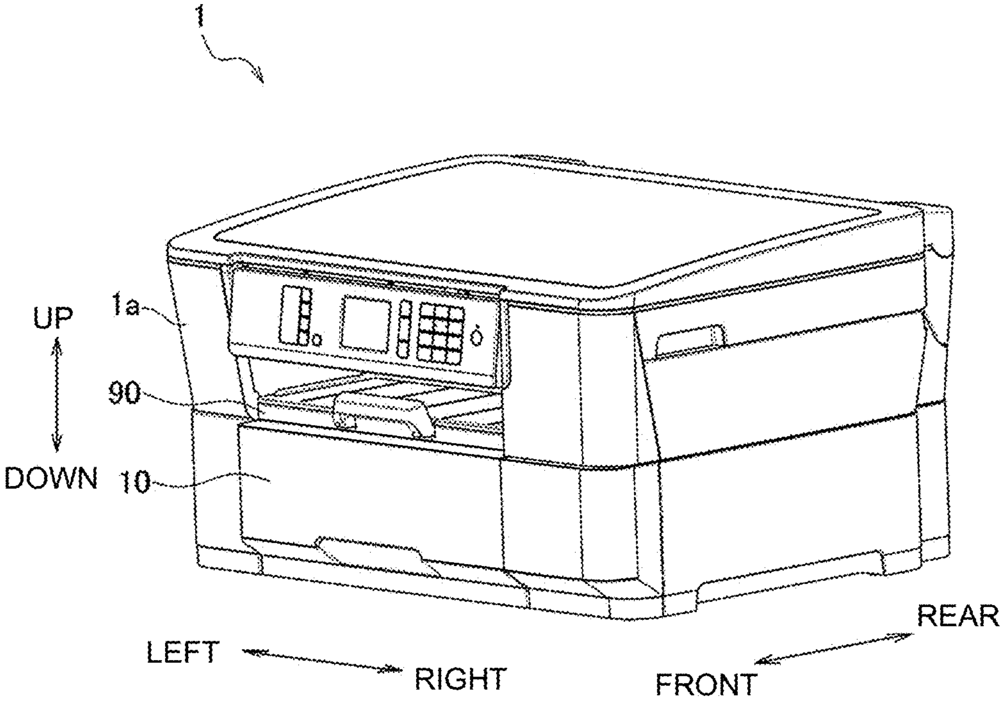
FIG. 1 is a perspective view of a printer 1.

As depicted in FIG. 1, a printer 1 (image recording apparatus) according to an embodiment of the present disclosure comprises a casing 1*a*, a paper feed tray 10 which is installable/removable with respect to the casing 1*a*, and a paper discharge tray 90.

Figure 2:
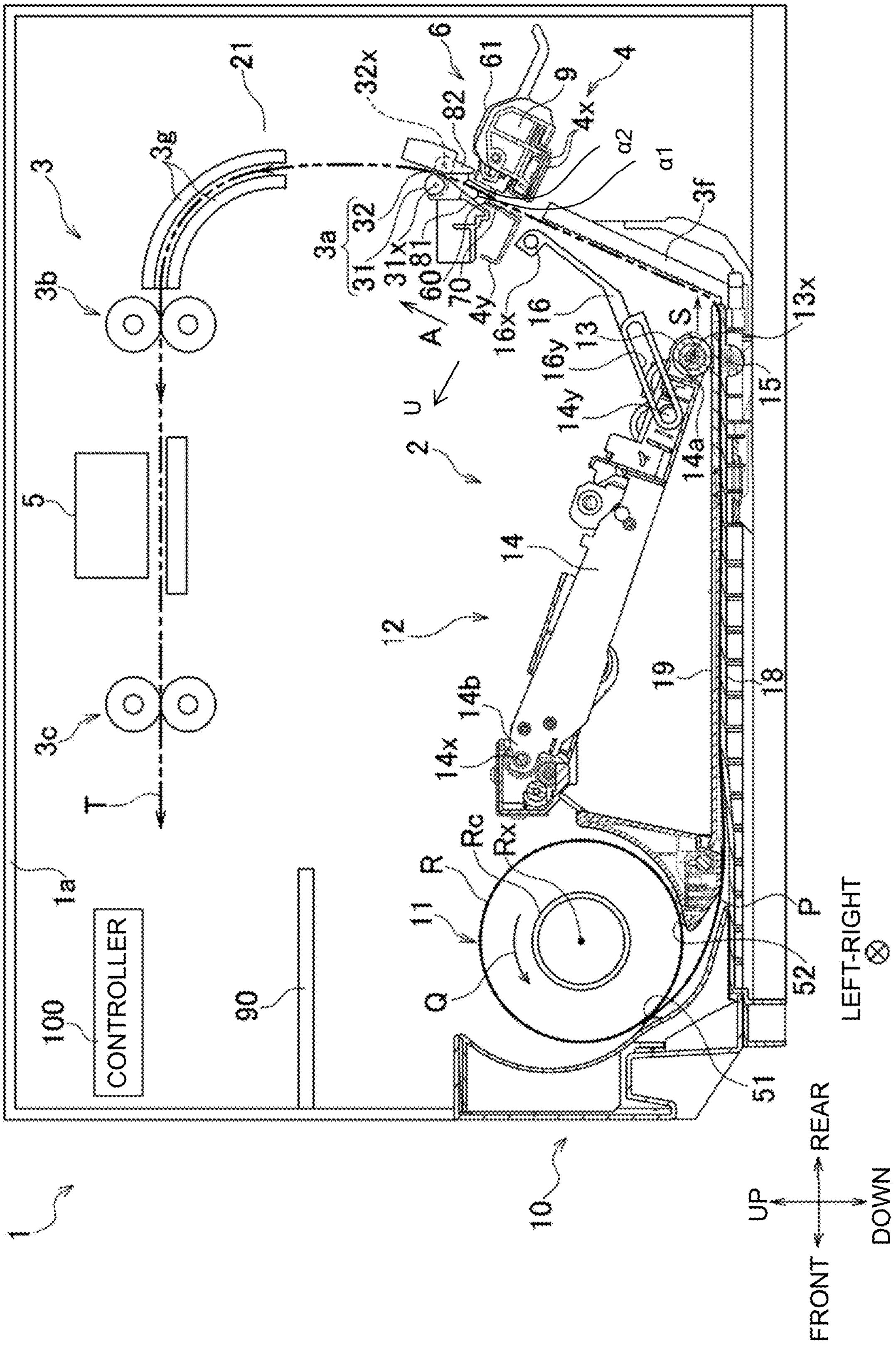
FIG. 2 is a schematic side view illustrative of an internal structure of the printer 1.

As depicted in FIG. 2, the printer 1 further comprises a conveyor 3, a head 5, a cutter unit 6, a scanning mechanism 4, and a controller 100. Components of the conveyor 3 except for rollers 51, 52 described later on, the head 5, the cutter unit 6, the scanning mechanism 4, and the controller 100 are supported by the casing 1*a*. The rollers 51, 52 are supported by the paper feed tray 10.

The conveyor 3 is constructed so that the recording paper P is conveyed in the conveying direction along with a conveyance path T. The conveyor 3 includes the rollers 51, 52, a roller 13, an arm 14, a guide member 16, a separation member 3*f*, a pair of guides 81, 82, roller pairs 3*a* to 3*c*, a pair of guide members 3*g*, and a conveyance motor 3*x* (see FIG. 4) for driving the respective rollers described above.

The rollers 51, 52, the roller 13, and the arm 14, which are included in the conveyor 3, constitute a feeding mechanism 2 which is capable of feeding the recording paper P accommodated in the paper feed tray 10 toward the conveyance path T.

The conveyance path T is a path which starts from the paper feed tray 10, which passes through the space between the pair of guide members 3*g*, which passes under the head 5, and which is directed to the paper discharge tray 90. The conveyance path T has a U-shaped portion disposed on the upstream side in the conveying direction with respect to the head 5. The separation member 3*f*, the cutter unit 6, the scanning mechanism 4, the pair of guides 81, 82, the roller pair 3*a*, and the pair of guide members 3*g* are arranged in the U-shaped portion. The cutter unit 6, the scanning mechanism 4, the pair of guides 81, 82, and the roller pair 3*a* are arranged at a bottom portion of the U-shaped portion. The cutter unit 6, the scanning mechanism 4, and the pair of guides 81, 82 are arranged on the downstream side in the conveying direction with respect to the separation member 3*f* and on the upstream side in the conveying direction with respect to the roller pair 3*a*.

The paper feed tray 10 corresponds to the "tray" of the present disclosure. The paper feed tray 10 includes a rolled paper accommodating unit 11 which is capable of accommodating rolled paper R (see FIG. 2), and a cut paper accommodating unit 12 which is capable of accommodating a plurality of sheets of cut paper Pc (see FIG. 3) in a state of being stacked in the upward-downward direction. The cut paper Pc, which is accommodated in the cut paper accommodating unit 12, is supported by the upper surface of a support plate 19 which is arranged along a bottom plate 18 of the paper feed tray 10.

When the rolled paper R is used in the paper feed tray 10, the cut paper Pc is removed from the cut paper accommodating unit 12 (see FIG. 2). When the cut paper Pc is used, the rolled paper R is removed from the rolled paper accommodating unit 11 (see FIG. 3). The cut paper accommodating unit 12 is the space disposed at the rear of the rolled paper accommodating unit 11.

The recording paper P generally refers to the recording paper unwound from the rolled paper R, and the cut paper Pc. The recording paper P corresponds to the "medium" of the present disclosure. The cut paper Pc refers to the recording paper having a length along the conveyance path T shorter than that of the recording paper for constructing the rolled paper R.

As for the rolled paper R, the lengthy recording paper P is wound in a roll form around the outer circumferential surface of a cylindrical core member Rc. The rolled paper R is accommodated in the rolled paper accommodating unit 11 in a state in which the rotation axis Rx thereof (central axis of the core member Rc) extends in the left-right direction.

The rollers 51, 52 are arranged at the bottom portion of the rolled paper accommodating unit 11. The rollers 51, 52 are rotatable about the centers of shafts extending in the left-right direction. When the rolled paper R is accommodated in the rolled paper accommodating unit 11, the rolled paper R is supported by the rollers 51, 52 at the outer circumferential surface of the lower portion thereof. When the rolled paper R is set, then the rolled paper R is manually rotated in the direction of the arrow Q depicted in FIG. 2, and the recording paper P is unwound from the rolled paper R. Then, the recording paper P is allowed to pass through the gap between the lower surface of the support plate 19 and the upper surface of the bottom plate 18. The forward end of the recording paper P is interposed between the roller 13 and a roller (runner) 15. The conveyance motor 3*x* (see FIG. 4) is driven in accordance with the control of the controller 100 in this state, and the rollers 51, 52, 13 are rotated. Accordingly, the recording paper P, which is unwound from the rolled paper R, is fed rearwardly (in the feeding direction S).

The roller 13 is supported by one end 14*a* of the arm 14. The roller 13 is rotatable about the center of a shaft 13*x* extending in the left-right direction. The other end 14*b* of the arm 14 is supported by the casing 1*a* by the aid of a shaft 14*x* extending in the left-right direction. The arm 14 is rotatable about the center of a shaft 14*x* by using the other end 14*b* as a supporting point (see FIGS. 2 and 3).

In the state in which the paper feed tray 10 is installed to the casing 1*a*, when the cut paper Pc is not accommodated in the cut paper accommodating unit 12, the roller 13 is brought in contact with the upper surface of the support plate 19 (see FIG. 2). In the state in which the paper feed tray 10 is installed to the casing 1*a*, when the cut paper Pc is accommodated in the cut paper accommodating unit 12, the roller 13 is brought in contact with the sheet of cut paper Pc disposed at the uppermost layer of the cut paper Pc accommodated in the cut paper accommodating unit 12 (see FIG. 3). In this situation, the conveyance motor 3*x* (see FIG. 4) is driven in accordance with the control of the controller 100, and the roller 13 is rotated. Accordingly, the cut paper Pc is fed rearwardly (in the feeding direction S).

The recording paper P (recording paper P unwound from the rolled paper R accommodated in the rolled paper accommodating unit 11 or cut paper Pc accommodated in the cut paper accommodating unit 12), which is fed by the roller 13 from the paper feed tray 10, is brought in contact with the separation member 3*f*. The recording paper P is moved along the separation member 3*f*, and the recording paper P is guided to the roller pair 3*a*.

The separation member 3*f* (corresponding to the "wall" of the present disclosure) is the member which constitutes the downstream end of the paper feed tray 10 in the feeding direction S. The separation member 3*f* defines the conveyance path T.

Figure 3:
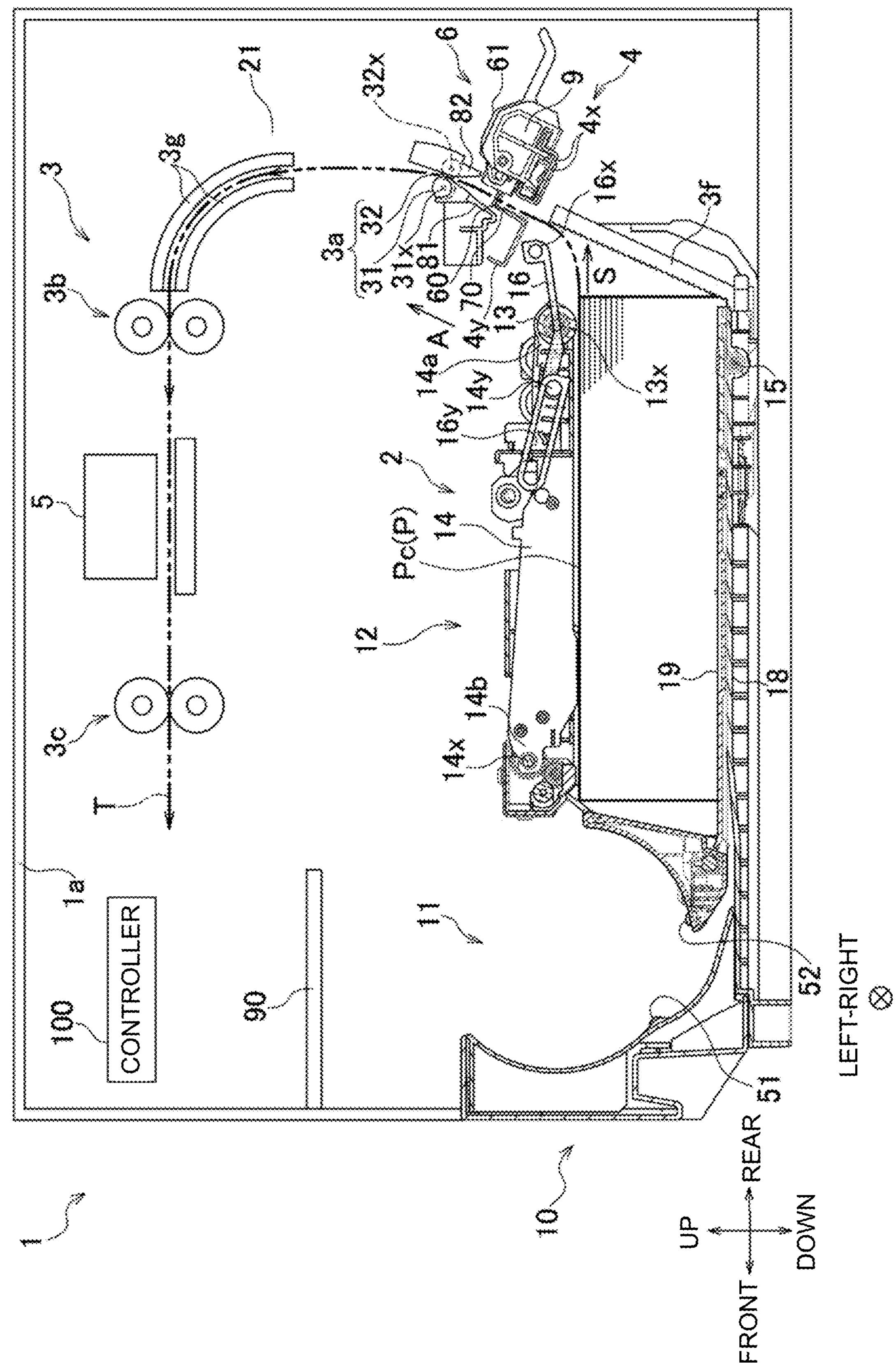
FIG. 3 is a schematic side view illustrative of a state in which the cut paper Pc is accommodated in a paper feed tray 10 in the printer 1.

The guide member 16 has a curved shape. The guide member 16 has one end at which a rotation shaft 16*x* (corresponding to the "first rotation shaft" of the present disclosure) is provided in the left-right direction, and the other end at which a slotted hole 16*y* is provided. A protrusion 14*y*, which is formed in the vicinity of one end 14*a* of the arm 14, is inserted into the slotted hole 16*y*. As depicted in FIGS. 2 and 3, the protrusion 14*y* is moved along the slotted hole 16*y* in accordance with the rotation of the arm 14, and thus the guide member 16 is rotated about the center of the rotation shaft 16*x*. The rotation shaft 16*x* is provided between the paper feed tray 10 and the cutter unit 6 in the conveyance path T.

The separation member 3*f* is arranged at the rear of the roller 13. The separation member 3*f* extends in an oblique direction intersecting both of the upward-downward direction and the front-rear direction. Fine or minute protrusions and recesses, which repeat along the conveyance path T, are formed on the surface of the separation member 3*f*. Owing to the protrusions and recesses, the overlapped feeding (phenomenon in which a plurality of sheets of cut paper Pc are conveyed in an overlapped state) is suppressed. That is, the separation member 3*f* has the function to separate the sheet of cut paper Pc brought in contact with the roller 13 from the other sheets of cut paper Pc.

The head 5 (corresponding to the "recording unit" of the present disclosure) includes a plurality of nozzles (not depicted) formed on the lower surface, and driver IC (not depicted). When the recording paper P, which is conveyed by the conveyor 3, passes through the position opposed to the lower surface of the head 5, the driver IC is driven in accordance with the control of the controller 100. Accordingly, the ink is ejected from the nozzles, the ink is landed on the recording paper P, and an image is recorded on the recording paper P. Note that the head 5 may be based on any one of the line system in which the ink is ejected from the nozzles in a state in which the position is fixed and the serial system in which the ink is ejected from the nozzles while moving in the left-right direction.

The cutter unit 6 is constructed so that the recording paper P, which is unwound from the rolled paper R, is cut between the separation member 3*f* and the roller pair 3*a* in the conveyance path T. The cutter unit 6 includes a cutter 60 (corresponding to the "second cutter" of the present disclosure) and a cutter 70 (corresponding to the "first cutter" of the present disclosure) which are arranged to interpose the conveyance path T and a holder 61 which holds the cutter 60. The holder 61 is attached installably/removably with respect to the carriage 9. The carriage 9 is reciprocatively movable in the left-right direction by means of the scanning mechanism 4. The left-right direction is parallel to the recording paper P disposed along the conveyance path T, and the left-right direction intersects the conveying direction A (see FIGS. 2 and 3: conveying direction in the vicinity of the cutter unit 6).

Figure 4:
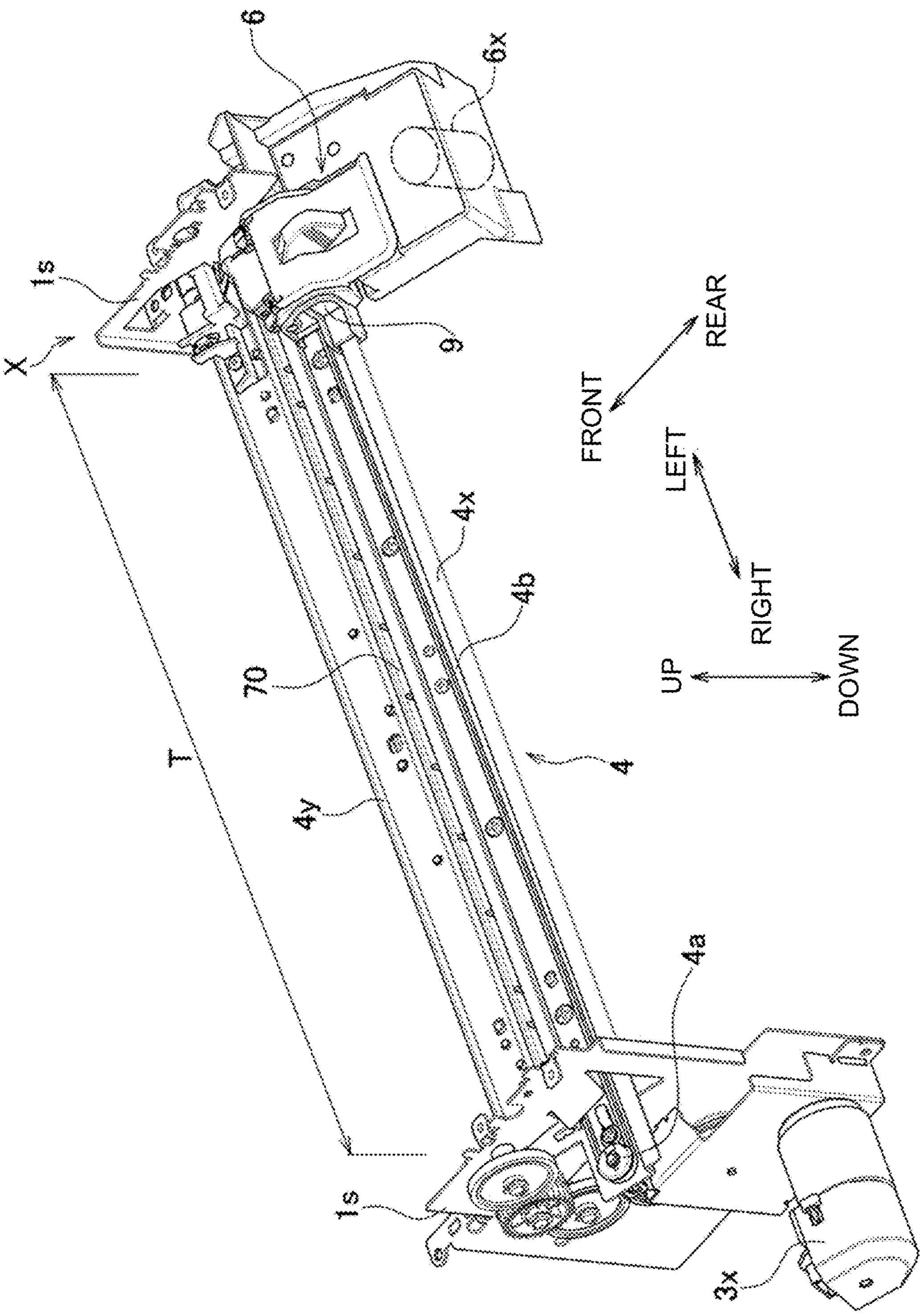
FIG. 4 is a perspective view illustrative of a cutter unit 6 and a scanning mechanism 4 included in the printer 1.

As depicted in FIG. 4, the scanning mechanism 4 includes a pair of guide rails 4*x*, 4*y* which extend in the left-right direction, a pair of pulleys 4*a* which are separated from each other in the left-right direction (only one of the pair of pulleys 4*a* is depicted in FIG. 4), a belt 4*b* which is wound around the pair of pulleys 4*a* and to which the carriage 9 is fixed, and a cutting motor 6*x*. The guide rail 4*y* is disposed in front of the guide rail 4*x*. The guide rail 4*y* is separated from the guide rail 4*x* with a slight gap intervene therebetween. The conveyance path T (see FIGS. 2 and 3) is formed in the gap.

As depicted in FIG. 4, the guide rails 4*x*, 4*y* are fixed to the pair of side frames is by the aid of screws or the like. The pair of side frames is are parts of the casing 1*a*, each of which is composed of a metal or the like. The pair of side frames 1*s* are separated from each other in the left-right direction, and the pair of side frames is support the left ends and the right ends of the guide rails 4*x*, 4*y*.

The pair of pulleys 4*a*, the belt 4*b*, and the cutting motor 6*x* are attached to the guide rail 4*x*. The guide rail 4*x* supports the carriage 9 which is fixed to the belt 4*b*, and the holder 61 and the cutter 60 which are installed to the carriage 9.

Figure 5:
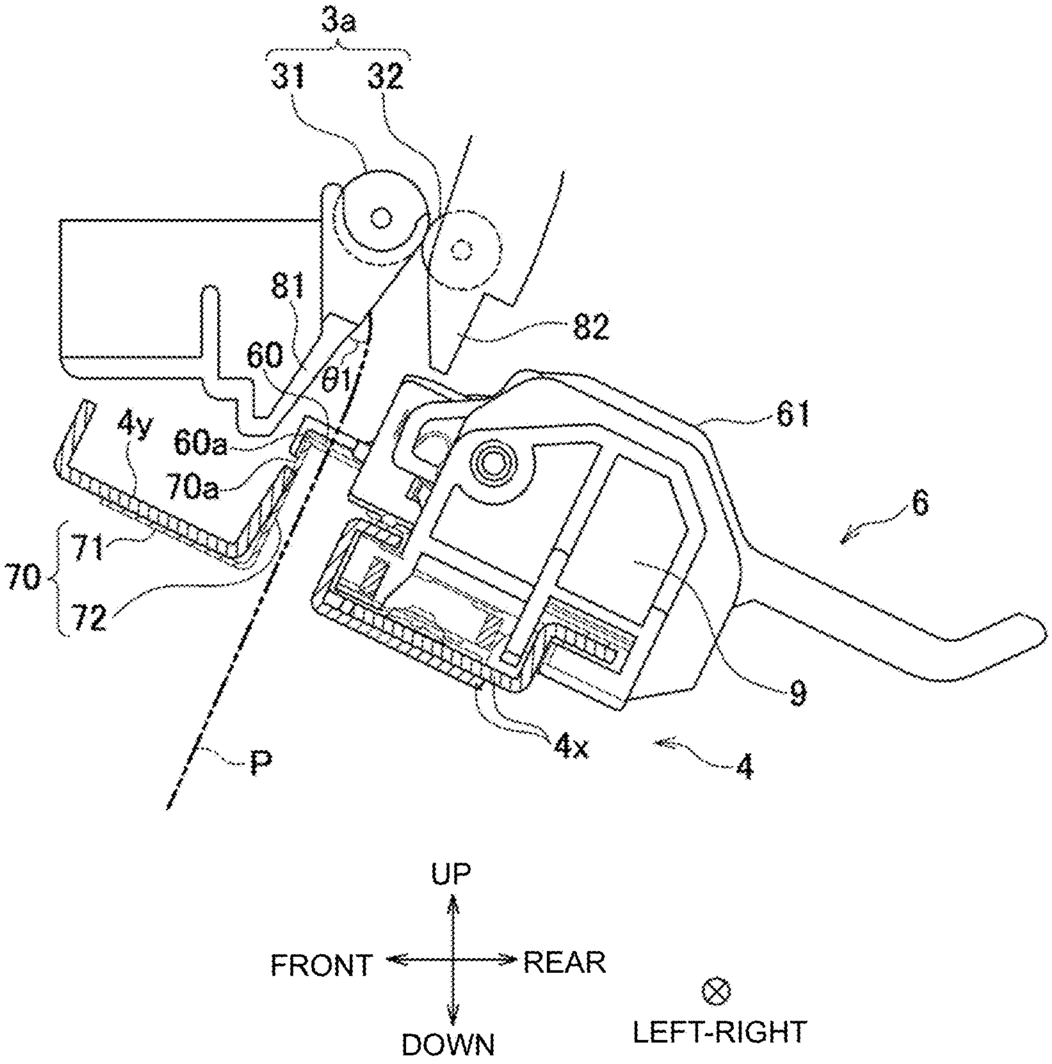
FIG. 5 is a partial enlarged view illustrative of the cutter unit 6 and a pair of guides 81, 82.

The guide rail 4*y* supports the cutter 70. As depicted in FIG. 5, the butter cutter 70 is L-shaped. The cutter 70 has a portion 71 which covers the lower surface of the guide rail 4*y*, and a portion 72 which covers the side surface of the guide rail 4*y* for defining the conveyance path T. The portion 72 of the cutter 70 extends along the conveyance path T. The cutter 70 has a blade 70*a* which is disposed at an end portion of the portion 72 on the downstream side in the conveying direction A.

The cutter 70 is fixed, while the cutter 60 is rotatable. The cutter 60 is disk-shaped, and the cutter 60 has a blade 60*a* disposed at the circumferential edge thereof. When the recording paper P is cut, then the blade 60*a* of the cutter 60 extends in the direction intersecting the recording paper P extending along the conveyance path T on the downstream side in the conveying direction A with respect to the blade 70*a* of the cutter 70, and the blade 60*a* of the cutter 60 is overlapped with the blade 70*a* of the cutter 70 in the conveying direction A.

When the cutting motor 6*x* (see FIG. 4) is driven in accordance with the control of the controller 100, then the belt 4*b* travels in the left-right direction, and the carriage 9 and the holder 61 are moved into the conveyance path T from the installation/removal position X disposed outside the conveyance path T. Further, in this situation, the cutter 60 is rotated in accordance with the driving of the cutting motor 6*x*. The recording paper P, which is unwound from the rolled paper R, is cut in the widthwise direction of the recording paper P by means of the cutter 70 which is fixed and the cutter 60 which is rotated while being moved in the left-right direction.

The installation/removal position X is disposed at the left ends of the guide rails 4*x*, 4*y*. The installation/removal position X is the home position of the movement of the carriage 9 as described above, and the installation/removal position X is also the position for installing/removing the holder 61 with respect to the carriage 9.

As depicted in FIG. 5, the pair of guides 81, 82 are arranged to interpose the conveyance path T. The pair of guides 81, 82 define the portion disposed on the downstream side in the conveying direction A (portion disposed between the cutting position brought about by the cutter unit 6 and the point of contact between two rollers 31, 32 described later on) with respect to the cutting position brought about by the cutter unit 6 in the conveyance path T. The cutting position resides in the portion at which the blades 60*a*, 70*a* of the cutters 60, 70 are overlapped with each other. The cutting position is the position at which the cutter 60 intersects the conveyance path T. The guide 81 (corresponding to the "first guide" of the present disclosure) is positioned frontwardly on the upstream side in the feeding direction S on the downstream side in the winding direction of the recording paper P for constructing the rolled paper R (direction of the arrow Q depicted in FIG. 2) with respect to the portion defined by the pair of guides 81, 82 in the conveyance path T (i.e., the portion interposed between the pair of guides 81, 82). The winding direction is the direction in which the recording paper P is wound around the rotation shaft Rx when the rolled paper R is formed. The winding direction is also the direction in which the rolled paper R is rotated about the rotation shaft Rx when the recording paper P is unwound from the rolled paper R. The guide 82 (corresponding to the "second guide" of the present disclosure) is positioned rearwardly on the downstream side in the feeding direction S (see FIG. 3) with respect to the portion defined by the pair of guides 81, 82 in the conveyance path T (i.e., the portion interposed between the pair of guides 81, 82).

As depicted in FIG. 5, the angle $\alpha 1$ on the acute angle side with respect to the portion of the guide 81 defined by the pair of guides 81, 82 in the conveyance path T (i.e., the portion interposed between the pair of guides 81, 82) is smaller than the $\alpha 2$ on the acute angle side with respect to the foregoing portion of the guide 82.

As depicted in FIG. 5, the foregoing portion (portion defined by the pair of guides 81, 82 in the conveyance path T) is orthogonal to the cutter 60. Further, as depicted in FIGS. 2 and 3, the foregoing portion is parallel to the portion of the conveyance path T defined by the separation member 3*f*, and the foregoing portion is parallel to the portion of the conveyance path T defined by the two rollers 31, 32 described later on. Each of the angles $\alpha 1$, $\alpha 2$ is the angle formed by the foregoing portion and the surface of each of the guides 81, 82 opposed to the conveyance path T.

Figure 6:
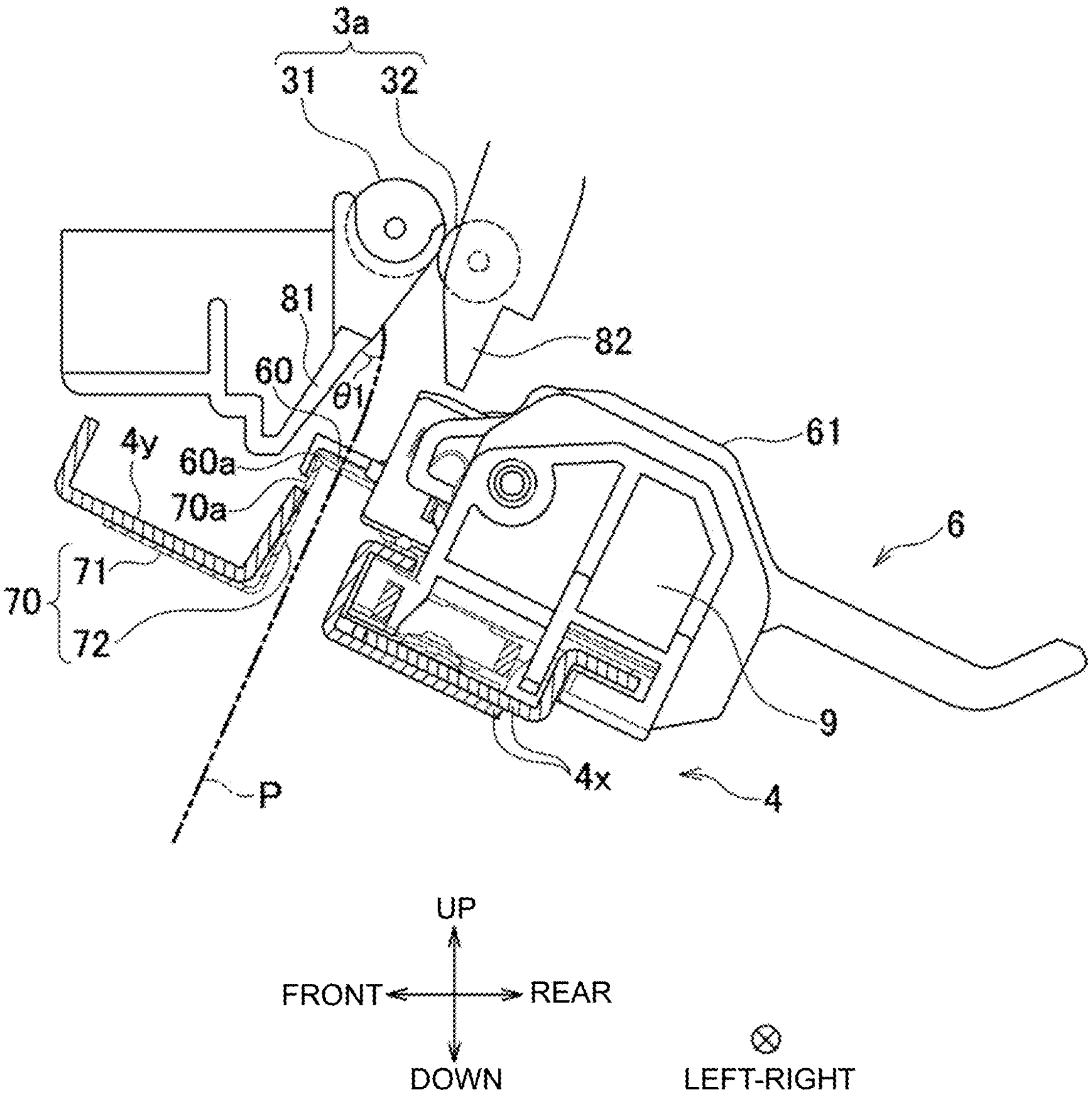
FIG. 6 is a schematic view illustrative of a situation in which the forward end of the recording paper unwound from the rolled paper abuts against the guide 81.
Figure 7:
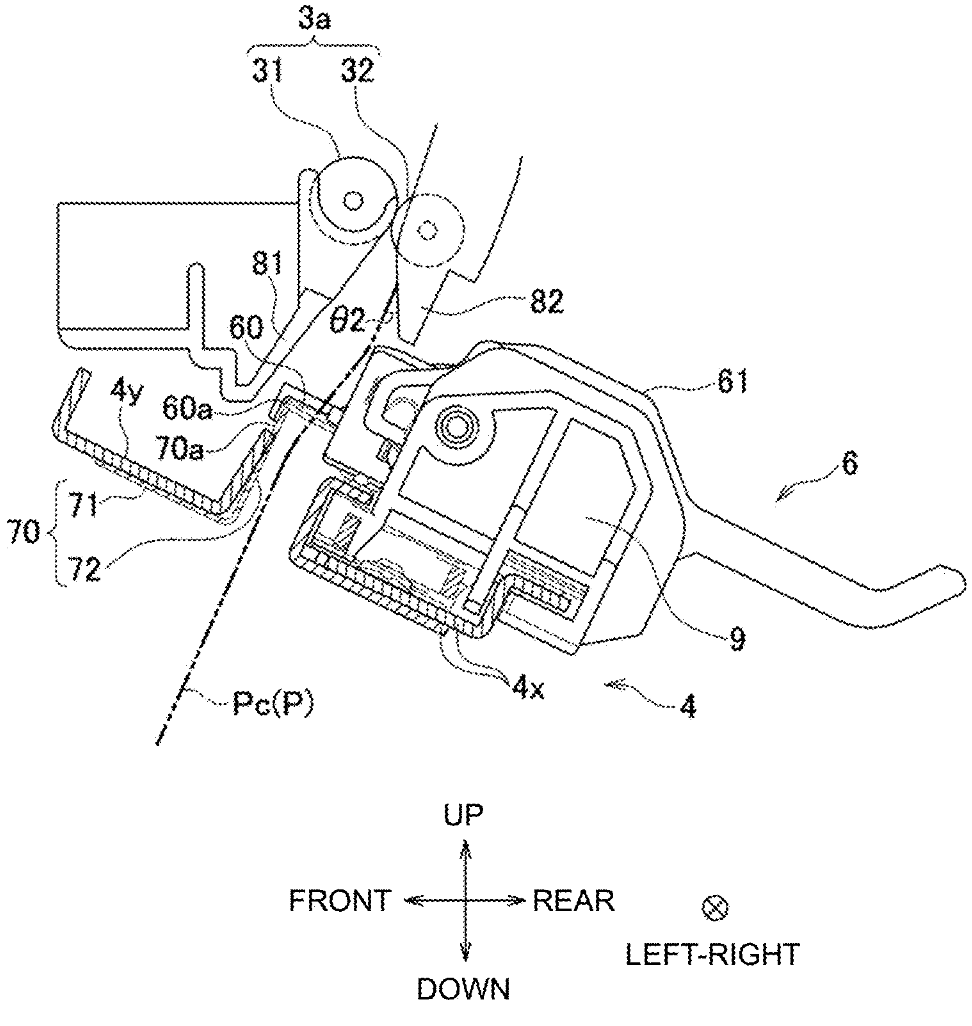
FIG. 7 is a schematic view illustrative of a situation in which the forward end of the cut paper abuts against the guide 82.

Further, it is designed that the angle $\theta 1$ (see FIG. 6) on the acute angle side formed by the surface of the guide 81 opposed to the conveyance path T and the forward end of the recording paper P unwound from the rolled paper R and allowed to abut against the guide 81 and the angle $\theta 2$ (see FIG. 7) on the acute angle side formed by the surface of the guide 82 opposed to the conveyance path T and the forward end of the recording paper P allowed to abut against the guide 82 are not more than 30 degrees respectively.

As depicted in FIG. 5, the cutter 70 is arranged on the same side (front side) as that of the guide 81 with respect to the conveyance path T. The cutter 60 is arranged on the same side (rear side) as that of the guide 82 with respect to the conveyance path T. Note that the cutter 60 has a portion which is arranged rearward with respect to the conveyance path T and a portion which is arranged frontward with respect to the conveyance path T. The downstream end of the cutter 70 in the conveying direction A (portion including the blade 70*a*) and the upstream end of the guide 81 in the conveying direction A are overlapped with each other in the direction U (direction orthogonal to the recording paper P extending along the conveyance path T).

As depicted in FIG. 5, the roller pair 3*a* (corresponding to the "roller pair" of the present disclosure) is arranged on the downstream side in the conveying direction A with respect to the cutter unit 6. The roller pair 3*a* is composed of the two rollers 31, 32. The two rollers 31, 32 are rotatable about the centers of the rotation shafts 31*x*, 32*x* extending in the left-right direction respectively. The guides 81, 82 have portions to support the rotation shafts 31*x*, 32*x* respectively.

As described above, according to this embodiment, the angle α1 of the guide 81 is smaller than the angle α2 of the guide 82 (see FIG. 5). For example, when the recording paper P, which is unwound from the rolled paper R, is conveyed by the conveyor 3, the forward end of the recording paper P is easily brought in contact with the guide 81 (see FIG. 6). In this situation, owing the small angle α1 of the guide 81, the angle θ1 on the acute angle side, which is formed by the surface of the guide 81 opposed to the conveyance path T and the forward end of the curled recording paper P allowed to abut against the surface, can be made not more than a predetermined value. It is possible to avoid the jamming. Therefore, the jamming hardly occurs, and hence it is possible to suppress the time and labor caused by the jamming. Further, for example, when the sheet of cut paper Pc, which is included in the plurality of sheets of cut paper Pc and which is disposed on the uppermost layer, is fed by the feeding mechanism 2, the forward end of the cut paper Pc is easily brought in contact with the guide 82 (see FIG. 7). In this situation, owing to the large angle α2 of the guide 82, the width of the path is large at the inlet portion of the pair of guides 81, 82. It is easy to introduce or invite the forward end of the cut paper Pc into the space between the pair of guides 81, 82. Therefore, the cut paper Pc can be guided appropriately, and hence the jamming hardly occurs. It is possible to suppress the time and labor caused by the jamming.

The guide 81 is positioned on the downstream side in the winding direction of the recording paper P for constructing the rolled paper R (direction of the arrow Q depicted in FIG. 2) with respect to the portion of the conveyance path T defined by the pair of guides 81, 82 (i.e., the portion interposed between the pair of guides 81, 82). In this case, the forward end of the recording paper P unwound from the rolled paper R is easily brought in contact with the guide 81 (see FIG. 6). However, as described above, owing to the small angle α1, it is possible to make the angle θ1 to be not more than the predetermined value. It is possible to avoid the jamming.

The guide 82 is positioned on the downstream side in the feeding direction S (see FIG. 3) with respect to the portion of the conveyance path T defined by the pair of guides 81, 82 (i.e., the portion interposed between the pair of guides 81, 82). In this case, the forward end of the cut paper Pc fed from the cut paper accommodating unit 12 is easily brought in contact with the guide 82 (see FIG. 7). However, as described above, owing to the large angle α2, the width of the path is large at the inlet portion of the pair of guides 81, 82. It is easy to introduce or invite the forward end of the cut paper Pc into the space between the pair of guides 81, 82.

The downstream end of the cutter 70 in the conveying direction A (portion including the blade 70*a*) and the upstream end of the guide 81 in the conveying direction A are overlapped with each other in the direction U (direction orthogonal to the recording paper P extending along the conveyance path T). If the downstream end of the cutter 70 in the conveying direction A and the upstream end of the guide 81 in the conveying direction A are not overlapped with each other in the direction U, then any gap appears therebetween, and the forward end of the recording paper P enters the gap. The jamming may occur. In particular, when the forward end of the recording paper P is curled, then the forward end easily enters the gap, and the jamming easily occurs. On the contrary, in this embodiment, the gap does not appear, and hence the jamming hardly occurs.

The angle θ1 (see FIG. 6) on the acute angle side, which is formed by the surface of the guide 81 opposed to the conveyance path T and the forward end of the recording paper P unwound from the rolled paper R and allowed to abut against the guide 81, is not more than 30 degrees. In this case, the recording paper P is not caught by the guide 81 irrelevant to the coefficient of friction between the guide 81 and the recording paper P. It is possible to smoothly convey the recording paper P.

The angle θ2 (see FIG. 7) on the acute angle side, which is formed by the surface of the guide 82 opposed to the conveyance path T and the forward end of the recording paper P allowed to abut against the guide 82, is not more than 30 degrees. In this case, the recording paper P is not caught by the guide 82 irrelevant to the coefficient of friction between the guide 82 and the recording paper P. It is possible to smoothly convey the recording paper P.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The embodiment of the present disclosure has been explained above. However, the present disclosure is not limited to the embodiment described above. It is possible to variously change the design within a scope defined in claims.

The portion, which is defined by the pair of guides in the conveyance path, is not limited to those which fulfill all of the requirement that the portion is orthogonal to the cutter, the requirement that the portion is parallel to the portion defined by the wall in the conveyance path, and the requirement that the portion is parallel to the portion defined by the two rollers in the conveyance path. The portion may be those which fulfill at least one of the requirements described above.

The cutter, which is included in the cutter unit, is composed of the cutter 60 which is disk-shaped and rotatable and the cutter 70 which is fixed in the embodiment described above. However, there is no limitation thereto. The cutter may be composed of a pair of cutters both of which are disk-shaped and rotatable. Further, the number of cutters included in the cutter unit is not limited to two. The number may be one or three or more.

In the embodiment described above, one (cutter 60) of the cutters included in the cutter unit is moved by the scanning mechanism. However, there is no limitation thereto. For example, all (for example, a pair of cutters both of which are disk-shaped and rotatable) of the cutters included in the cutter unit may be moved by the scanning mechanism.

It is also allowable that the cutter unit does not include a plurality of cutters but the cutter unit includes one cutter.

The medium is not limited to paper. The medium may be cloth or plastic film. That is, the medium may be composed of any arbitrary material provided that the medium has a form of sheet.

The recording unit may eject any liquid other than the ink (for example, a processing liquid for coagulating or depositing any component contained in the ink). Further, the recording unit is not limited to the liquid ejection system. It is also allowable to use the laser system, the thermal transfer system or the like.

The present disclosure is not limited to the printer, which is also applicable, for example, to facsimiles, copying machines, and multifunction machines.

What is claimed is:

1. An image recording apparatus comprising:

a tray configured to accommodate a medium in sheet form;

a conveyor configured to convey the medium accommodated in the tray in a conveying direction along a conveyance path;

a recording unit configured to record an image on the medium conveyed by the conveyor; and a cutter unit including at least one cutter configured to cut the medium in the conveyance path, wherein the tray is configured to accommodate a roll member in which the medium is wound in a roll form;

the conveyor is configured to convey, along the conveyance path, the medium unwound from the roll member accommodated in the tray, the conveyor including:

a feeding mechanism configured to feed the medium accommodated in the tray in a feeding direction toward the conveyance path; and a pair of guides configured to interpose the conveyance path, wherein the pair of guides extends along a first portion of the conveyance path disposed downstream in the conveying direction of a cutting position brought about by the cutter unit in the conveyance path, the pair of guides includes a first guide and a second guide, with each guide located on opposing sides of the first portion of the conveyance path, the first guide is located downstream of the second guide in a winding direction of the medium for constructing the roll member, and an angle of the first guide with respect to the first portion of the conveyance path is smaller than an angle of the second guide with respect to the first portion of the conveyance path.

2. The image recording apparatus according to claim 1, wherein the tray is configured to accommodate a plurality of sheets of the medium in a stacked state, and the feeding mechanism is configured to feed a sheet of the medium disposed on an uppermost layer of the plurality of sheets of the medium accommodated in the tray.

3. The image recording apparatus according to claim 1, wherein the first portion of the conveyance path is orthogonal to the at least one cutter.

4. The image recording apparatus according to claim 1, wherein the conveyor includes a wall constituting a downstream end in the feeding direction of the tray and defining the conveyance path, and the first portion of the conveyance path is parallel to a second portion of the conveyance path defined by the wall in the conveyance path.

5. The image recording apparatus according to claim 1, wherein the conveyor includes a roller pair including two rollers, the roller pair being arranged downstream, in the conveying direction, of the first portion of the conveyance path, and the first portion of the conveyance path is parallel to a third portion of the conveyance path defined by the two rollers in the conveyance path.

6. The image recording apparatus according to claim 1, wherein the at least one cutter includes a first cutter and a second cutter which interpose the conveyance path, the first cutter is arranged on a same side as that of the first guide with respect to the conveyance path, the second cutter is arranged on a same side as that of the second guide with respect to the conveyance path, and a downstream end in the conveying direction of the first cutter and an upstream end in the conveying direction of the first guide overlap with each other in a direction orthogonal to the medium extending along the conveyance path.

7. The image recording apparatus according to claim 1, wherein an angle on an acute angle side, which is formed by a surface of the first guide opposed to the conveyance path and a location where a forward end of the medium would abut against the surface when conveyed along the conveying path, is not more than 30 degrees.

8. The image recording apparatus according to claim 1, wherein an angle on an acute angle side, which is formed by a surface of the second guide opposed to the conveyance path and a location where a forward end of the medium would abut against the surface when conveyed along the conveying path, is not more than 30 degrees.

* * * * *